(12) United States Patent
Elomari

(10) Patent No.: US 9,206,052 B2
(45) Date of Patent: Dec. 8, 2015

(54) METHOD FOR PREPARING ZEOLITE SSZ-35

(71) Applicant: Saleh Ali Elomari, Fairfield, CA (US)

(72) Inventor: Saleh Ali Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 341 days.

(21) Appl. No.: 14/028,015

(22) Filed: Sep. 16, 2013

(65) Prior Publication Data

US 2015/0078990 A1 Mar. 19, 2015

(51) Int. Cl.
*C01B 39/48* (2006.01)
*C01B 39/12* (2006.01)
*B01J 29/86* (2006.01)
*B01J 29/70* (2006.01)

(52) U.S. Cl.
CPC ............... *C01B 39/48* (2013.01); *C01B 39/12* (2013.01); *B01J 29/70* (2013.01); *B01J 29/86* (2013.01)

(58) Field of Classification Search
CPC .......... C01B 39/12; C01B 39/48; B01J 29/70; B01J 29/86
See application file for complete search history.

(56) References Cited

U.S. PATENT DOCUMENTS

| | | | |
|---|---|---|---|
| 5,316,753 A * | 5/1994 | Nakagawa | B01J 29/04 423/328.1 |
| 5,391,287 A | 2/1995 | Nakagawa | |
| 5,958,370 A * | 9/1999 | Zones | B01D 53/02 208/111.01 |
| 6,086,848 A * | 7/2000 | Nakagawa | B01J 29/04 423/706 |
| 7,754,187 B2 * | 7/2010 | Cao | B01J 29/80 423/703 |

FOREIGN PATENT DOCUMENTS

JP 2002137918 5/2002
WO 98/29339 7/1998

OTHER PUBLICATIONS

P. Wagner, S.I. Zones, M.E. Davis and R.C. Medrud "SSZ-35 and SSZ-44: Two Related Zeolites Containing Pores Circumscribed by Ten- and Eighteen-Membered Rings" Angew. Chem. Int. Ed. 1999, 38, 1269-1272.
P. Wagner, Y. Nakagawa, G.S. Lee, M.E. Davis, S. Elomari, R.C. Medrud and S.I. Zones "Guest/Host Relationships in the Synthesis of the Novel Cage-Based Zeolites SSZ-35, SSZ-36, and SSZ-39" J. Am. Chem. Soc. 2000, 122, 263-273.
Y. Kurata, T. Hanaoka and H. Hamada "Synthesis of Zeolite SSZ-35 using N-methyl hexahydrojulolidinium salt as a new family of structure-directing agents (SDAs)" Stud. Surf. Sci. Catal. 2001, 135, 366-371 (Computer Optical Disc).
B. Gil, S.I. Zones, S-J. Hwang, M. Bejblova and J. Cejka "Acidic Properties of SSZ-33 and SSZ-35 Novel Zeolites: a Complex Infrared and MAS NMR Study" J. Phys. Chem C 2008, 112, 2997-3007.
PCT International Search Report, PCT/US2014/031298, mailed Jul. 1, 2014.
S.I. Zones, A.W. Burton, G.S. Lee, and M.M. Olmstead "A Study of Piperidinium Structure-Directing Agents in the Synthesis of Silica Molecular Sieves under Fluoride-Based Conditions" J. Am. Chem. Soc. 2007, 129, 9066-9079.

* cited by examiner

*Primary Examiner* — David M Brunsman
(74) *Attorney, Agent, or Firm* — Terrence M. Flaherty

(57) ABSTRACT

A method for making zeolite SSZ-35 having the framework structure STF is disclosed using a N,N-diethyl-2,3-dimethylpiperidinium cation or a N,N-dimethyl-2-isopropylpiperidinium cation as a structure directing agent.

13 Claims, 4 Drawing Sheets

METHOD FOR PREPARING ZEOLITE SSZ-35

TECHNICAL FIELD

This disclosure relates generally to a method of making zeolite SSZ-35 using a N,N-diethyl-2,3-dimethylpiperidinium cation or a N,N-dimethyl-2-isopropylpiperidinium cation as a structure directing agent.

BACKGROUND

Zeolites are a commercially important class of crystalline materials. They have distinct crystal structures with ordered pore structures which are demonstrated by distinct X-ray diffraction patterns. The crystal structure defines cavities and pores which are characteristic of the different species.

Zeolites identified by the International Zeolite Associate as having the structure code STF are known. For example, the zeolite known as SSZ-35 is a known crystalline STF material. U.S. Pat. No. 5,316,753 discloses the preparation of SSZ-35 using various conformationally constrained aza-polycyclic ring systems as structure directing agents (SDAs), including 3,3-dimethyl-3-azonia-7-methyl-7-aza-bicyclononane, N-ethyl-N-methyl-9-azoniabicyclo[3.3.1]nonane, and 1,3,3,8,8-pentamethyl-3-azoniabicyclo[3.2.1]octane.

Japanese Patent Publication No. 2002-137918 discloses the synthesis of SSZ-35 using a cis,cis,cis-N-methyl hexahydrojulolidinium cation as a structure directing agent.

However, these SDAs are complex and costly, which makes the synthesis of SSZ-35 using these SDAs complex and costly. This cost can limit the usefulness of SSZ-35 in commercial processes. Thus, it would be desirable to find a way to synthesize SSZ-35 without having to use these SDAs.

It has now been found that SSZ-35 can be prepared using a N,N-diethyl-2,3-dimethylpiperidinium cation or a N,N-dimethyl-2-isopropylpiperidinium cation as a substitute for these complex and costly SDAs.

SUMMARY

In one aspect, there is provided a method of preparing zeolite SSZ-35 by contacting under crystallization conditions (1) at least one source of at least one oxide of a tetravalent element; (2) optionally, one or more sources of one or more oxides selected from the group consisting of oxides of trivalent elements, pentavalent elements, and mixtures thereof; (3) hydroxide ions; and (4) a structure directing agent selected from the group consisting of a N,N-diethyl-2,3-dimethylpiperidinium cation and a N,N-dimethyl-2-isopropylpiperidinium cation.

There is also provided a process for preparing zeolite SSZ-35 by: (a) preparing a reaction mixture containing (1) at least one source of at least one oxide of a tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a structure directing agent selected from the group consisting of a N,N-diethyl-2,3-dimethylpiperidinium cation and a N,N-dimethyl-2-isopropylpiperidinium cation; and (6) water; and (b) maintaining the reaction mixture under crystallization conditions sufficient to form crystals of the SSZ-35 zeolite.

In yet another aspect, there is provided a SSZ-35 zeolite having a composition, as-synthesized and in its anhydrous state, in terms of mole ratios, as follows:

|  | Broad | Exemplary |
| --- | --- | --- |
| $TO_2/X_2O_n$ | ≥10 | 20 to 60 |
| $Q/TO_2$ | 0.01 to 0.10 | 0.01 to 0.10 |
| $M/TO_2$ | 0 to 0.04 | 0 to 0.04 | wherein: (1) T is selected from the group consisting of tetravalent elements from Groups 4-14 of the Periodic Table, and mixtures thereof; (2) X is selected from the group consisting of trivalent and pentavalent elements from Groups 3-13 of the Periodic Table, and mixtures thereof; (3) stoichiometric variable n equals the valence state of compositional variable X (e.g., when X is trivalent, n=3; when X is pentavalent, n=5); (4) Q is a structure directing agent selected from the group consisting of a N,N-diethyl-2,3-dimethylpiperidinium cation and a N,N-dimethyl-2-isopropylpiperidinium cation; and (5) M is selected from the group consisting of elements from Groups 1 and 2 of the Periodic Table.

It should be noted that a $TO_2/X_2O_n$ molar ratio of at least 10 includes the case where there is no $X_2O_n$, i.e. the mole ratio of $TO_2$ to $X_2O_n$ is infinity. In that case, the zeolite is comprised of essentially all of $TO_2$.

DETAILED DESCRIPTION

Introduction

Figure 1:
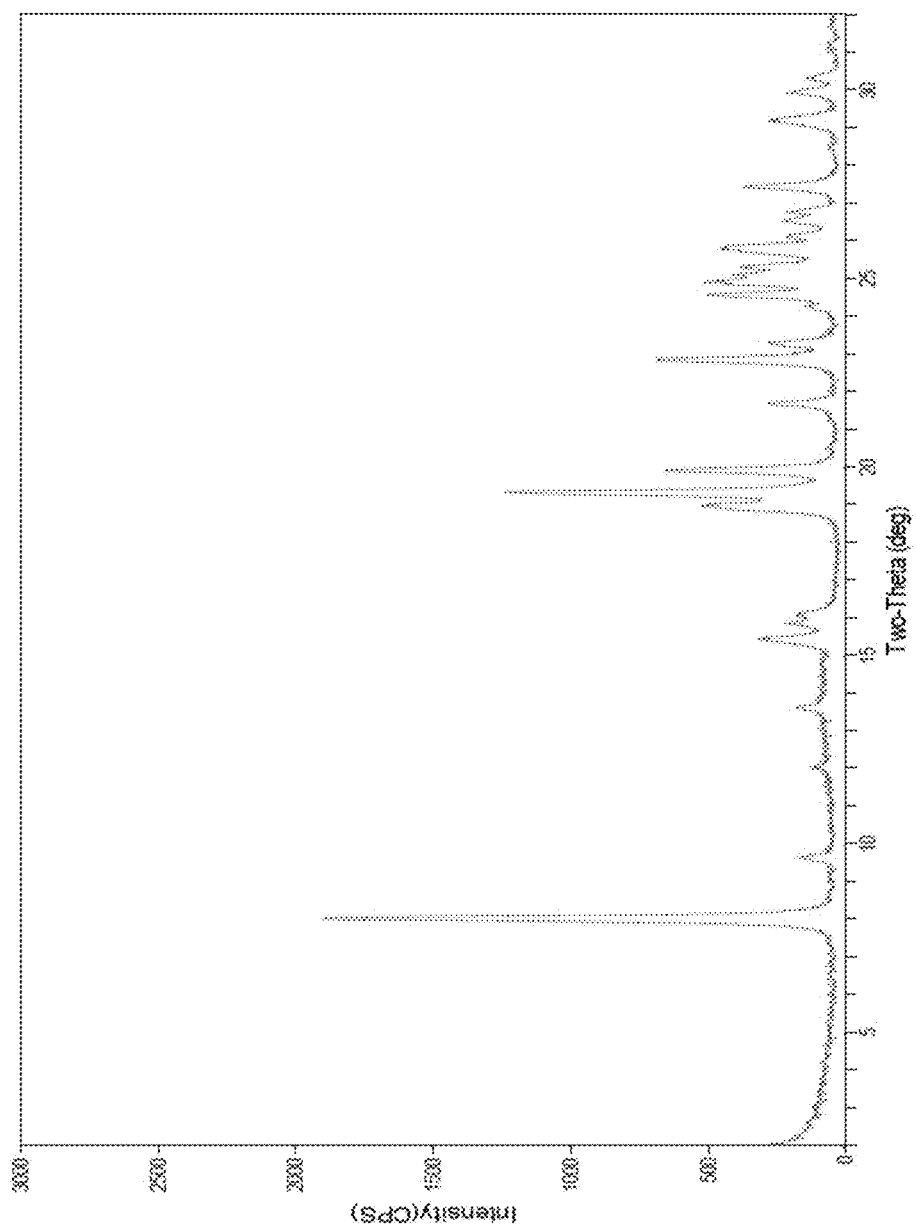
FIG. 1 is a powder X-ray diffraction (XRD) pattern of the as-synthesized aluminosilicate SSZ-35 zeolite prepared in Example 3.

The following terms will be used throughout the specification and will have the following meanings unless otherwise indicated.

The term "active source" means a reagent or precursor material capable of supplying at least one element in a form that can react and which can be incorporated into the zeolite structure. The terms "source" and "active source" can be used interchangeably herein.

The term "Periodic Table" refers to the version of IUPAC Periodic Table of the Elements dated Jun. 22, 2007, and the numbering scheme for the Periodic Table Groups is as described in *Chem. Eng. News,* 63(5), 26-27 (1985).

In preparing SSZ-35, a N,N-diethyl-2,3-dimethylpiperidinium cation or a N,N-dimethyl-2-isopropylpiperidinium cation is used as a structure directing agent ("SDA"), also known as a crystallization template. The SDAs useful for making SSZ-35 are represented by the following structures (1) and (2):

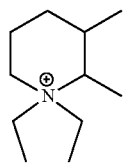

N,N-diethyl-2,3-dimethyl-piperidinium cation (1)

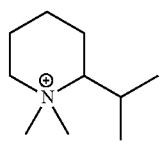

N,N-dimethyl-2-isopropylpiper-idinium cation (2)

The SDA cation is associated with anions which can be any anion that is not detrimental to the formation of SSZ-35. Representative anions include elements from Group 17 of the Periodic Table (e.g., fluoride, chloride, bromide and iodide), hydroxide, acetate, sulfate, tetrafluoroborate, carboxylate, and the like.

Reaction Mixture

In general, SSZ-35 is prepared by: (a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a structure directing agent selected from the group consisting of a N,N-diethyl-2,3-dimethylpiperidinium cation and a N,N-dimethyl-2-isopropylpiperidinium cation; and (6) water; and (b) maintaining the reaction mixture under conditions sufficient to form crystals of the zeolite.

The composition of the reaction mixture from which SSZ-35 is formed, in terms of mole ratios, is identified in Table 1 below, wherein compositional variables T, X, Q, and M and stoichiometric variable n are as described herein above.

TABLE 1

| Components | Broad | Exemplary |
|---|---|---|
| $TO_2/X_2O_n$ | $\geq 10$ | 20 to 60 |
| $M/TO_2$ | 0.01 to 0.50 | 0.03 to 0.40 |
| $Q/TO_2$ | 0.05 to 0.50 | 0.05 to 0.40 |
| $OH/TO_2$ | 0.10 to 0.70 | 0.15 to 0.40 |
| $H_2O/TO_2$ | 15 to 100 | 20 to 50 |

In one sub-embodiment, the composition of the reaction mixture from which the SSZ-35 zeolite is formed, in terms of mole ratios, is identified in Table 2 below, wherein compositional variables M and Q are as described herein above.

TABLE 2

| Components | Broad | Exemplary |
|---|---|---|
| $SiO_2/B_2O_3$ | $\geq 10$ | 20 to 60 |
| $M/SiO_2$ | 0.01 to 0.50 | 0.03 to 0.40 |
| $Q/SiO_2$ | 0.05 to 0.50 | 0.05 to 0.40 |

TABLE 2-continued

| Components | Broad | Exemplary |
|---|---|---|
| $OH/SiO_2$ | 0.10 to 0.70 | 0.15 to 0.40 |
| $H_2O/SiO_2$ | 15 to 100 | 20 to 50 |

In another sub-embodiment, the composition of the reaction mixture from which the SSZ-35 zeolite is formed, in terms of mole ratios, is identified in Table 3 below, wherein compositional variables M and Q are as described herein above.

TABLE 3

| Components | Broad | Exemplary |
|---|---|---|
| $SiO_2/Al_2O_3$ | $\geq 10$ | 20 to 60 |
| $M/SiO_2$ | 0.01 to 0.50 | 0.03 to 0.40 |
| $Q/SiO_2$ | 0.05 to 0.50 | 0.05 to 0.40 |
| $OH/SiO_2$ | 0.10 to 0.70 | 0.15 to 0.40 |
| $H_2O/SiO_2$ | 15 to 100 | 20 to 50 |

As noted above, for each embodiment described herein, T is selected from the group consisting of tetravalent elements from Groups 4-14 of the Periodic Table. In one sub-embodiment, T is selected from the group consisting of silicon (Si), germanium (Ge), titanium (Ti), and mixtures thereof. In another sub-embodiment, T is selected from the group consisting of Si, Ge, and mixtures thereof. In one sub-embodiment, T is Si. Sources of elements selected for composition variable T include oxides, hydroxides, acetates, oxalates, ammonium salts and sulfates of the element(s) selected for T. In one sub-embodiment, each source of the element(s) selected for composition variable T is an oxide.

Sources of silicon oxide useful herein include fumed silica, precipitated silicates, silica hydrogel, silicic acid, colloidal silica, tetra-alkyl orthosilicates (e.g., tetraethyl orthosilicate), and silica hydroxides. Sources useful herein for Ge include germanium oxide and germanium ethoxide.

For each embodiment described herein, X is selected from the group consisting of elements from Groups 3-13 of the Periodic Table. In one sub-embodiment, X is selected from the group consisting of boron (B), aluminum (Al), gallium (Ga), indium (In), iron (Fe), and mixtures thereof. In another sub-embodiment, X is selected from the group consisting of B, Al, Ga, In, and mixtures thereof. Sources of elements selected for optional composition variable X include oxides, hydroxides, acetates, oxalates, ammonium salts and sulfates of the element(s) selected for X.

Sources of aluminum oxide useful herein include aluminates, alumina, and aluminum compounds such as $AlCl_3$, $Al_2(SO_4)_3$, $Al(OH)_3$, kaolin clays, and other zeolites. An example of the source of aluminum oxide is LZ-210 zeolite (a type of Y zeolite). Boron, gallium, and iron can be added in forms corresponding to their aluminum and silicon counterparts.

Sources of boron oxide useful herein include borosilicate glasses, alkali-metal borates, boric acid, borate esters, and certain zeolites.

As described herein above, for each embodiment described herein, the reaction mixture can be formed using at least one source of an elements selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxide, hydroxides, nitrates, sulfates, halides, oxalates, citrates and acetates thereof.

For each embodiment described herein, the zeolite reaction mixture can be supplied by more than one source. Also, two or more reaction components can be provided by one source.

The reaction mixture can be prepared either batch wise or continuously. Crystal size, morphology and crystallization time of the zeolite described herein can vary with the nature of the reaction mixture and the crystallization conditions.

Crystallization and Post-Synthesis Treatment

In practice, the zeolite is prepared by: (a) preparing a reaction mixture as described herein above; and (b) maintaining the reaction mixture under crystallization conditions sufficient to form crystals of the zeolite.

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by one skilled in the art that the zeolites described herein can contain impurities, such as amorphous materials, unit cells having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are added in an amount between 1% and 10% of the weight of the source for compositional variable T used in the reaction mixture.

Once the zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the zeolite. The SDA can also be removed by photolysis techniques (e.g., exposing the SDA-containing zeolite product to light or electromagnetic radiation that has a wavelength shorter than visible light under conditions sufficient to selectively remove the organic compound from the zeolite) as described in U.S. Pat. No. 6,960,327.

The zeolite can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Where the zeolite formed is an intermediate zeolite, the target zeolite can be achieved using post-synthesis techniques such as heteroatom lattice substitution techniques. The target zeolite (e.g., silicate SSZ-35) can also be achieved by removing heteroatoms from the lattice by known techniques such as acid leaching.

Characterization of the Zeolite

Zeolites made by the process described herein have a composition, as-synthesized and in the anhydrous state, as described in Table 4 (in terms of mole ratios), wherein compositional variables T, X, M and Q and stoichiometric variable n are as described herein above:

TABLE 4

|  | Broad | Exemplary |
| --- | --- | --- |
| $TO_2/X_2O_n$ | ≥10 | 20 to 60 |
| $Q/TO_2$ | 0.01 to 0.10 | 0.01 to 0.10 |
| $M/TO_2$ | 0 to 0.04 | 0 to 0.04 |

In one sub-embodiment, the zeolites made by the process described herein have a composition, as-synthesized and in the anhydrous state, as described in Table 5 (in terms of mole ratios), wherein compositional variables M and Q are as described herein above:

TABLE 5

|  | Broad | Exemplary |
| --- | --- | --- |
| $SiO_2/B_2O_3$ | ≥10 | 20 to 60 |
| $Q/SiO_2$ | 0.01 to 0.10 | 0.01 to 0.10 |
| $M/SiO_2$ | 0 to 0.04 | 0 to 0.04 |

In another sub-embodiment, the zeolites made by the process described herein have a composition, as-synthesized and in the anhydrous state, as described in Table 6 (in terms of mole ratios), wherein compositional variables M and Q are as described herein above:

TABLE 6

|  | Broad | Exemplary |
| --- | --- | --- |
| $SiO_2/Al_2O_3$ | ≥10 | 20 to 60 |
| $Q/SiO_2$ | 0.01 to 0.10 | 0.01 to 0.10 |
| $M/SiO_2$ | 0 to 0.04 | 0 to 0.04 |

Zeolites synthesized by the process disclosed herein can be characterized by their XRD pattern. The powder XRD lines of Table 7 are representative of as-synthesized SSZ-35 made in accordance with the method described herein. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the T/X mole ratio from sample to sample. Calcination can also cause minor shifts in the X-ray diffraction pattern. Notwithstanding these minor perturbations, the basic crystal lattice structure remains unchanged.

TABLE 7

Characteristic Peaks for As-Synthesized SSZ-35

| 2-Theta[a] | d-spacing (nm) | Relative Intensity[b] |
|---|---|---|
| 8.00 | 1.105 | VS |
| 16.00 | 0.554 | M |
| 18.88 | 0.470 | S |
| 19.30 | 0.460 | VS |
| 19.84 | 0.447 | M |
| 22.82 | 0.389 | M |
| 24.50 | 0.363 | M |
| 24.80 | 0.359 | S |
| 25.28 | 0.353 | S |
| 25.76 | 0.346 | M |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The X-ray diffraction pattern lines of Table 8 are representative of calcined SSZ-35 made in accordance with the method described herein.

TABLE 8

Characteristic Peaks for Calcined SSZ-35

| 2-Theta[a] | d-spacing (nm) | Relative Intensity[b] |
|---|---|---|
| 8.02 | 1.101 | VS |
| 19.02 | 0.466 | M |
| 19.44 | 0.456 | S |
| 19.90 | 0.446 | M |
| 22.94 | 0.387 | M |
| 23.38 | 0.380 | M |
| 24.74 | 0.359 | M |
| 25.42 | 0.350 | M |
| 25.82 | 0.345 | M |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

EXAMPLES

The following illustrative examples are intended to be non-limiting.

Example 1

Synthesis of N,N-diethyl-2,3-dimethylpiperidinium Cation

A 3-neck round-bottom flask (equipped with a mechanical stirrer, a heating mantle and reflux condenser) was charged with a one molar equivalent of 2,3-dimethylpiperidine in enough methanol to make a 0.5M concentration solution with respect to 2,3-dimethylpiperidine (note that the 2,3-dimethylpiperidine can be purchased directly from commercial sources or can be prepared by metal-catalyzed hydrogenation of 2,3-dimethylpyridine). To this solution, 1.5 molar equivalent of potassium bicarbonate was added. The solution was stirred for several minutes and then 2.5 molar equivalent of ethyl iodide was added dropwise via an addition funnel. Once the addition of ethyl iodide was completed, the reaction mixture was heated at reflux (about 55° C.) for several hours. The heat source was turned off and the reaction mixture was then stirred at room temperature for additional 48 hours. The progress of the reaction was monitored by NMR. Once completed, the reaction mixture was transferred to a recovery flask and the solvent removed on a rotary evaporator at reduced pressure. The obtained solids, a mixture of the product and potassium bicarbonate, were suspended in chloroform (500 mL CHCl$_3$/1 mol 2,3-dimethylpiperidine). The resulting two-phase solution was filtered through a fritted-glass funnel. The filtrate containing the product (N,N-diethyl-2,3-dimethylpiperidinium iodide) was concentrated on a rotary evaporator at reduced pressure to give the desired salt as an off-white solid. The product was further purified by dissolving in a minimal amount of isopropyl alcohol and precipitating the product out by adding diethyl ether. The precipitate was filtered and dried on a rotary evaporator in a hot bath (70° C.) at reduced pressure to give the desired pure product in about 88% yield. The obtained N,N-diethyl-2,3-dimethylpiperidinium iodide was dissolved in deionized water (1 mL H$_2$O/1 mmol salt) and then 1.1 g of hydroxide-based ion exchange resin/1 mmol salt was added. The resulting slurry was left to stir gently for a few hours. The slurry was filtered and the filtrate was analyzed by titration of a small aliquot with dilute HCl. The exchange afforded N,N-diethyl-2,3-dimethylpiperidinium hydroxide in nearly quantitative yield.

Scheme 1 below depicts the synthesis of the SDA.

SCHEME 1

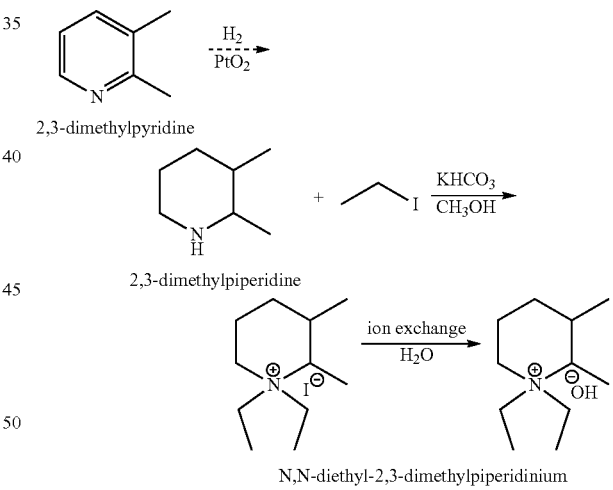

Example 2

Synthesis of N,N-dimethyl-2-isopropylpiperidinium Cation

N,N-dimethyl-2-isopropylpiperidinium cation was synthesized in the manner as described in Example 1 starting with 2-isopropylpiperidine, potassium bicarbonate and methyl iodide in methanol as the reagents. The reaction afforded N,N-dimethyl-2-isopropylpiperidinium iodide in greater than 95% yield. The iodide counter-ion was ion exchanged for hydroxide in the manner as described in Example 1 to afford the corresponding N,N-dimethyl-2-isopropylpiperidinium hydroxide in quantitative yield.

Scheme 2 below depicts the synthesis of the SDA.

SCHEME 2

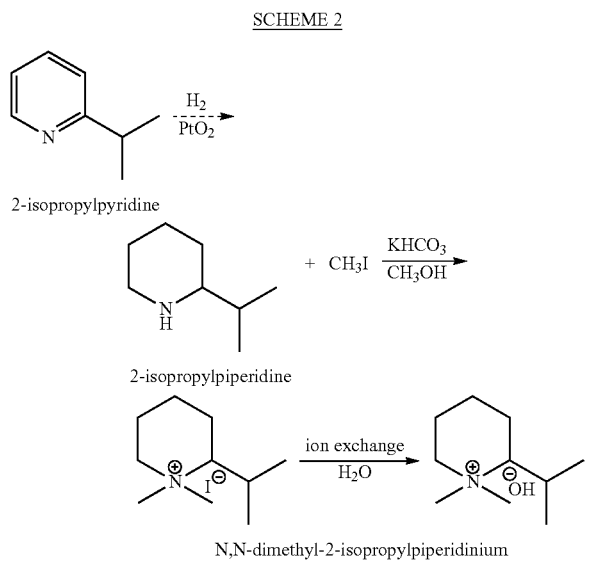

Example 3

Synthesis of Aluminosilicate SSZ-35 (Al-SSZ-35)

Using a N,N-diethyl-2,3-dimethylpiperidinium Cation 4.5 g of 0.55M solution of N,N-diethyl-2,3-dimethylpiperidinium hydroxide, 1.5 g of a 1N NaOH aqueous solution, and 4.6 g of deionized water were all mixed in a 23 mL Teflon liner. To this solution, 0.035 g of Reheis F-2000 aluminum hydroxide was added and stirred until dissolved. Then, 0.9 g of CAB-O-SIL® M-5 fumed silica was added in and the solution was stirred until a very homogeneous gel was obtained. The resulting gel was capped off in the Teflon liner and placed in an autoclave and heated in an oven on a rotating spit at 170° C. for 5 days. The gel mixture turned into a clear solution with fine powdery solids settled at the bottom of the Teflon liner. The solid mixture was filtered into a fitted-glass funnel. The collected solids were washed thoroughly with 1 L of deionized water and were left to dry overnight under vacuum. The solids were further dried in an oven at 125° C. for 2 hours to give 0.87 g of product.

Figure 2:
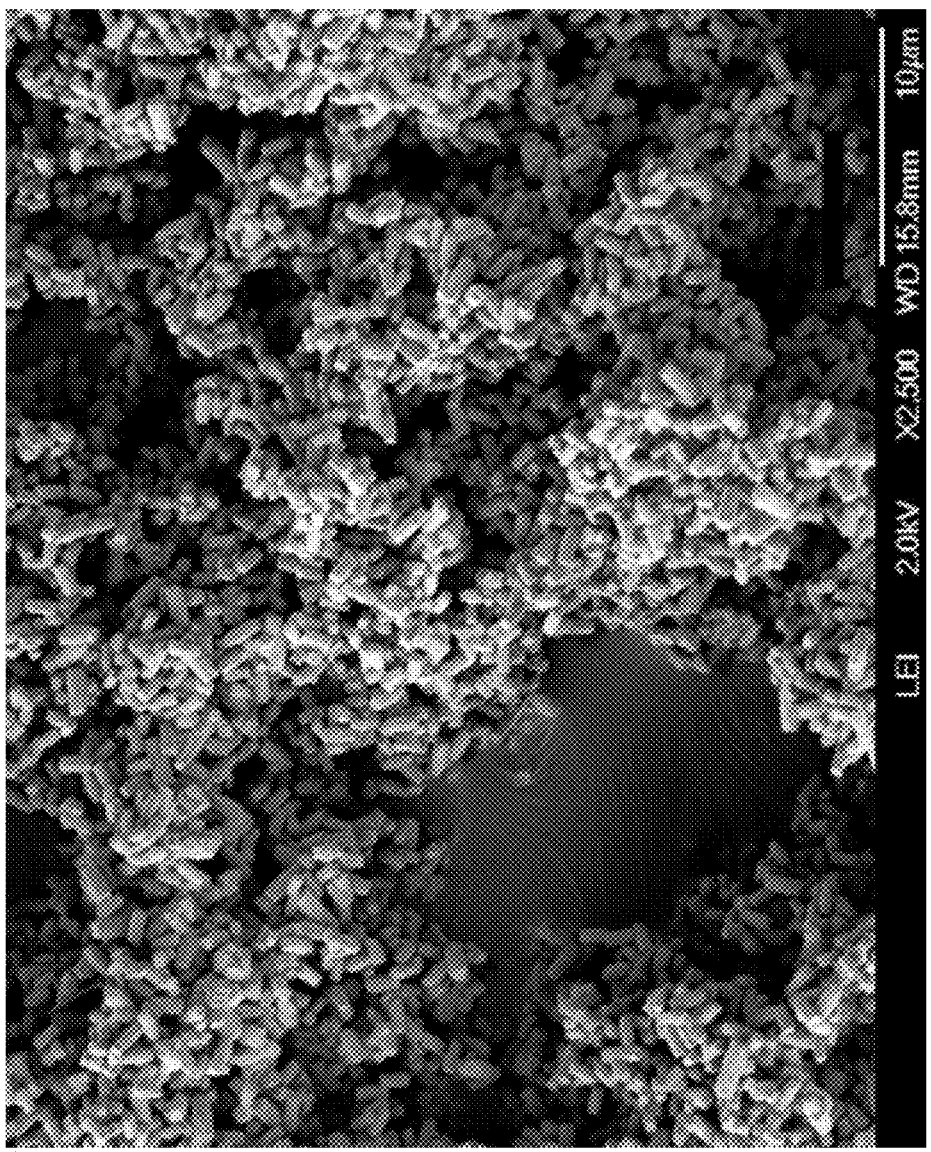
FIG. 2 is a Scanning Electron Microscopy (SEM) image of the as-synthesized aluminosilicate SSZ-35 zeolite prepared in Example 3.

The resulting product was analyzed by powder XRD and SEM. FIG. 1 is the powder XRD pattern of the product, which showed the product to be SSZ-35. Table 9 below shows the powder XRD lines for the resulting product. FIG. 2 shows a SEM image of the product.

TABLE 9

| 2-Theta[a] | d-spacing (nm) | Relative Intensity[b] |
|---|---|---|
| 8.00 | 1.105 | VS |
| 9.62 | 0.919 | W |
| 11.98 | 0.738 | W |
| 13.60 | 0.651 | W |
| 15.42 | 0.574 | W |
| 16.00 | 0.553 | M |

TABLE 9-continued

| 2-Theta[a] | d-spacing (nm) | Relative Intensity[b] |
|---|---|---|
| 18.88 | 0.469 | S |
| 19.30 | 0.460 | VS |
| 19.84 | 0.447 | M |
| 21.64 | 0.410 | W |
| 22.82 | 0.389 | M |
| 23.24 | 0.382 | W |
| 24.18 | 0.368 | W |
| 24.50 | 0.363 | M |
| 24.80 | 0.359 | S |
| 25.28 | 0.352 | S |
| 25.76 | 0.346 | M |
| 26.08 | 0.341 | W |
| 26.44 | 0.337 | W |
| 26.76 | 0.333 | W |
| 27.40 | 0.325 | W |
| 29.20 | 0.306 | W |
| 29.90 | 0.299 | W |

[a]±0.20
[b]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

Example 4

Calcination of As-Synthesized Al-SSZ-35

Figure 3:
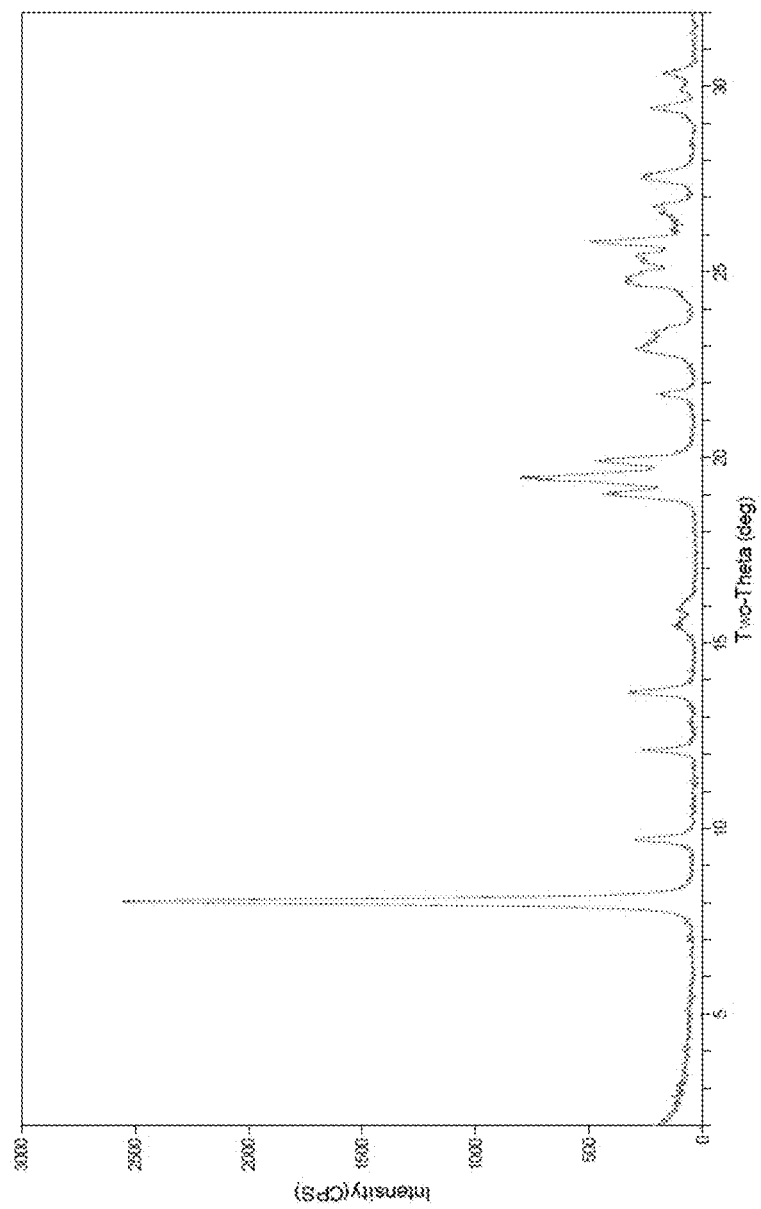
FIG. 3 is a powder XRD pattern of the calcined aluminosilicate SSZ-35 zeolite prepared in Example 4.

The product of Example 3 was calcined in air in a muffle furnace oven from room temperature to 120° C. at a rate of 1° C./minute and held at 120° C. for 2 hours. The temperature was then ramped up to 540° C. at a rate of 1° C./minute. The sample was held at 540° C. for 5 hours. The temperature was then increased at the same rate (1° C./min) to 595° C. and held there for 5 hours. Upon calcination, the sample lost 17% of its pre-calcination weight. The product was analyzed by powder XRD. The resulting powder XRD pattern is shown in FIG. 3. Table 10 below shows the powder XRD lines for the resulting product. The XRD pattern indicates that the material remains stable after calcination to remove the organic SDA.

The micropore volume and external surface area of calcined SSZ-35 were then measured by nitrogen physisorption using the BET method. The measured micropore volume was 0.20 cm$^3$/g, the external surface area was 30.20 m$^2$/g and the BET surface area was 465.6 m$^2$/g.

TABLE 10

| 2-Theta[a] | d-spacing (nm) | Relative Intensity[b] |
|---|---|---|
| 8.02 | 1.101 | VS |
| 9.70 | 0.911 | W |
| 12.12 | 0.730 | W |
| 13.64 | 0.648 | W |
| 15.46 | 0.573 | W |
| 15.90 | 0.557 | W |
| 19.02 | 0.466 | M |
| 19.44 | 0.456 | S |
| 19.90 | 0.446 | M |
| 21.72 | 0.409 | W |
| 22.94 | 0.387 | M |
| 23.38 | 0.380 | M |
| 24.74 | 0.359 | M |
| 25.42 | 0.350 | M |
| 25.82 | 0.345 | M |
| 26.76 | 0.333 | W |
| 27.52 | 0.324 | W |
| 29.40 | 0.304 | W |

TABLE 10-continued

| 2-Theta$^{(a)}$ | d-spacing (nm) | Relative Intensity$^{(b)}$ |
|---|---|---|
| 29.86 | 0.299 | W |
| 30.34 | 0.294 | W |

$^{(a)}$±0.20
$^{(b)}$The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

Example 5

Synthesis of Al-SSZ-35

Using a N,N-dimethyl-2-isopropylpiperidinium Cation

Figure 4:
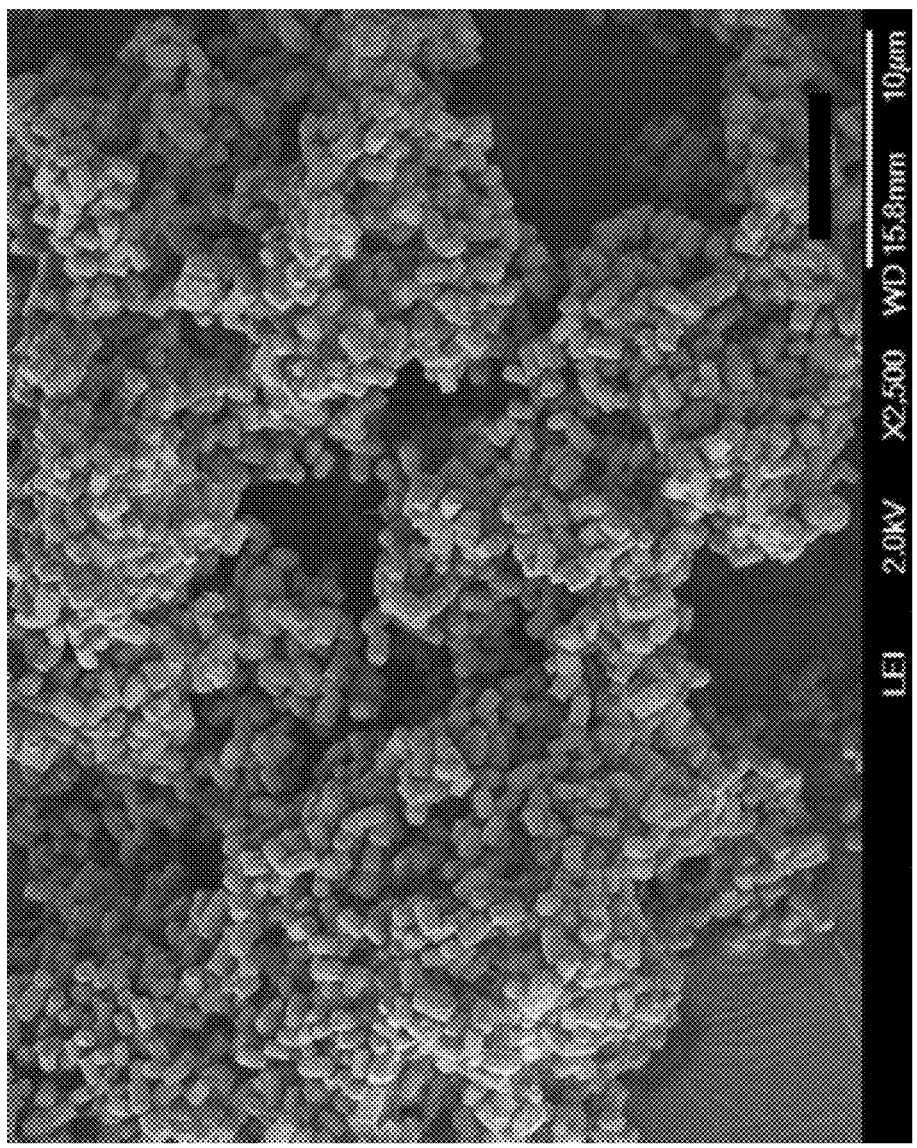
FIG. 4 is a SEM image of the as-synthesized aluminosilicate SSZ-35 zeolite prepared in Example 5.

The procedure from Example 3 was repeated except that N,N-dimethyl-2-isopropylpiperidinium hydroxide (0.45M solution) was used as the structure directing agent. The reaction afforded 0.85 g of Al-SSZ-35 after six days of heating. FIG. 4 is a SEM image of the as-synthesized product.

Example 6

Synthesis of Borosilicate SSZ-35 (B-SSZ-35)

Using N,N-diethyl-2,3-dimethylpiperidinium Cation 6 g of 0.55M solution of N,N-diethyl-2,3-dimethylpiperidinium hydroxide, 1.2 g of a 1N NaOH aqueous solution, and 5.6 g of deionized water were all mixed in a 23 mL Teflon liner. To this solution, 0.062 g of sodium borate decahydrate was added and stirred until dissolved. Then, 0.9 g of CAB-O-SIL® M-5 fumed silica was added in and the solution was stirred until a very homogeneous gel was obtained. The resulting gel was capped off in the Teflon liner and placed in an autoclave and heated in an oven on a rotating spit at 170° C. for 8 days. The gel mixture turned into a clear solution with fine powdery solids settled at the bottom of the Teflon liner. The solid mixture was filtered into a fritted-glass funnel. The collected solids were washed thoroughly with 1 L of deionized water and were left to dry overnight under vacuum. The solids were further dried in an oven at 125° C. for 2 hours to give 0.83 g of product.

The resulting product was analyzed by powder XRD, which showed the product to be SSZ-35.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing zeolite SSZ-35, comprising:
   (a) preparing a reaction mixture containing: (1) at least one source of at least one oxide of a tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a structure directing agent selected from the group consisting of a N,N-diethyl-2,3-dimethylpiperidinium cation and a N,N-dimethyl-2-isopropylpiperidinium cation; and (6) water; and
   (b) maintaining the reaction mixture under crystallization conditions sufficient to form crystals of the zeolite.

2. The method of claim 1, wherein the zeolite is prepared from a reaction mixture comprising, in terms of mole ratios, the following:

| | |
|---|---|
| $TO_2/X_2O_n$ | ≥10 |
| $M/TO_2$ | 0.01 to 0.50 |
| $Q/TO_2$ | 0.05 to 0.50 |
| $OH/TO_2$ | 0.10 to 0.70 |
| $H_2O/TO_2$ | 15 to 100 | wherein:
   (1) T is selected from the group consisting of tetravalent elements from Groups 4-14 of the Periodic Table, and mixtures thereof;
   (2) X is selected from the group consisting of trivalent and pentavalent elements from Groups 3-13 of the Periodic Table, and mixtures thereof;
   (3) n equals the valence state of X;
   (4) M is selected from the group consisting of elements from Groups 1 and 2 of the Periodic Table; and
   (5) Q is a structure directing agent selected from the group consisting of a N,N-diethyl-2,3-dimethylpiperidinium cation and a N,N-dimethyl-2-isopropylpiperidinium cation.

3. The method of claim 2, wherein T is selected from the group consisting of Si, Ge, and mixtures thereof.

4. The method of claim 2, wherein X is selected from the group consisting of B, Al, Ga, In, and mixtures thereof.

5. The method of claim 2, wherein T is Si and X is B.

6. The method of claim 2, wherein T is Si and X is Al.

7. The method of claim 2, wherein the zeolite is prepared from a reaction mixture comprising, in terms of mole ratios, the following:

| | |
|---|---|
| $TO_2/X_2O_n$ | 20 to 60 |
| $M/TO_2$ | 0.03 to 0.40 |

-continued

| | |
|---|---|
| $Q/TO_2$ | 0.05 to 0.40 |
| $OH/TO_2$ | 0.15 to 0.40 |
| $H_2O/TO_2$ | 20 to 50. |

8. The method of claim 1, wherein the structure directing agent is a N,N-diethyl-2,3-dimethylpiperidinium cation.

9. The method of claim 1, wherein the structure directing agent is a N,N-dimethyl-2-isopropylpiperidinium cation.

10. The method of claim 1, wherein the zeolite has a composition, as-synthesized and in its anhydrous state, in terms of mole ratios, as follows:

| | |
|---|---|
| $TO_2/X_2O_n$ | ≥10 |
| $Q/TO_2$ | 0.01 to 0.10 |
| $M/TO_2$ | 0 to 0.04 | wherein:
(1) T is selected from the group consisting of tetravalent elements from Groups 4-14 of the Periodic Table, and mixtures thereof;
(2) X is selected from the group consisting of trivalent and pentavalent elements from Groups 3-13 of the Periodic Table, and mixtures thereof;
(3) n equals the valence state of X;
(4) Q is a structure directing agent selected from the group consisting of a N,N-diethyl-2,3-dimethylpiperidinium cation and a N,N-dimethyl-2-isopropylpiperidinium cation; and
(5) M is selected from the group consisting of elements from Groups 1 and 2 of the Periodic Table.

11. The method of claim 10, wherein the zeolite has a composition, as-synthesized and in its anhydrous state, in terms of mole ratios, as follows:

| | |
|---|---|
| $TO_2/X_2O_n$ | 20 to 60 |
| $Q/TO_2$ | 0.01 to 0.10 |
| $M/TO_2$ | 0 to 0.04. |

12. The method of claim 10, wherein T is Si and X is B.

13. The method of claim 10, wherein T is Si and X is Al.

* * * * *